United States Patent [19]

Nakamura

[11] Patent Number: 5,914,093
[45] Date of Patent: Jun. 22, 1999

[54] PROCESS FOR SIMULTANEOUSLY PRODUCING HYDROGEN AND CARBON BLACK

[75] Inventor: Naoki Nakamura, Shizuoka, Japan

[73] Assignee: Toyota Jidosha Kabushiki Kaisha, Toyota, Japan

[21] Appl. No.: 08/870,295

[22] Filed: Jun. 6, 1997

[30]     Foreign Application Priority Data

Jun. 25, 1996 [JP] Japan ................................. 8-164558

[51] Int. Cl.$^6$ ..................................................... C09C 1/44
[52] U.S. Cl. ............................................. 423/458; 423/651
[58] Field of Search ...................................... 423/651, 458

[56]         References Cited

U.S. PATENT DOCUMENTS 4,244,810  1/1981  Youngblood et al. ................. 423/651

OTHER PUBLICATIONS

"Hydrogen Energy Handbook" pp. 23–49, Jan. 25, 1982.

"Carbon Black" pp. 1–19, May 1, 1978.

*Primary Examiner*—Michael L. Lewis
*Assistant Examiner*—Stuart Hendrickson
*Attorney, Agent, or Firm*—Oblon, Spivak, McClelland, Maier & Neustadt, P.C.

[57]         ABSTRACT

A process for simultaneously producing carbon black and hydrogen, wherein ethylene is fed into a reaction system having a temperature of 400° C. or above and a pressure of not less than 5 kg/cm$^2$ in an inert atmosphere in the presence of a nickel catalyst to decompose ethylene according to the following formula:

$$C_2H_4 \Delta 2C + 2H_2$$

4 Claims, 4 Drawing Sheets

PROCESS FOR SIMULTANEOUSLY PRODUCING HYDROGEN AND CARBON BLACK

TABLE 1

| Production process | Features | Feedstock |
| --- | --- | --- |
| Furnace process | A preheated feedstock is introduced in a turbulent flow state into a furnace heated to about 1500° C. to cause instantaneous thermal decomposition, immediately after which the resultant spray is cooled with water and filtered to collect carbon black. | Coal-derived or petroleum-derived heavy fuel oil |
| Channel process | A partially burned, small diffusional flame is brought into contact with the bottom of a cooled channel steel to collect carbon black. | Natural gas or coal gas |
| Acetylene process | Acetylene gas is continuously subjected to thermal decomposition at about 1800° C., and the resultant carbon black is separated and collected in the same manner as described above in connection with the furnace process. | Acetylene gas |
| Thermal process | A discontinuous system wherein natural gas is thermally decomposed in the absence of air and any flame. | Natural gas |
| Lamp process | A feedstock is directly burned in a closed space, followed by settling and separation to collect carbon black. | Coal-derived or petroleum-derived oil, animal or vegetable oil |

BACKGROUND OF THE INVENTION

1. Field of the Invention

The present invention relates to a process for simultaneously producing carbon black and hydrogen.

2. Description of the Related Art

Hydrogen is a fundamental starting compound for use in the production of basic chemicals and, at the same time, an important form of primary energy.

At the present time, industrial hydrogen is mainly produced by steam reforming or partial oxidation of a carbonaceous feedstock, such as naphtha or natural gas.

For example, in steam reforming, a relatively light hydrocarbon feedstock, such as a gas oil of naphtha grade, a natural gas (methane), or an off-gas derived from petroleum refining (such as methane, propane, and butane), is reacted with steam under conditions of a pressure of 5 to 20 atm and a high temperature of 700 to 850° C. over a catalyst according to the following formulae:

$$C_nH_{2n+2} + nH_2O \Delta nCO + (2n+1) H_2$$

$$C_nH_{2n+2} + 2nH_2O \Delta nCO_2 + (3n+1) H_2$$

$$CO + H_2O \Delta CO_2 \Delta H_2$$

to give a synthesis gas which is a mixture of carbon monoxide with carbon dioxide and hydrogen. In partial oxidation, a hydrocarbon is reacted with oxygen or air and steam under conditions of a pressure of atmospheric pressure to 50 atm and a temperature of about 1300° C. to give a synthesis gas which is a mixture of hydrogen with carbon monoxide and the like.

On the other hand, carbon black is used as a filler, a pigment and the like. It is produced by instantaneously carbonizing a hydrocarbon feedstock at a high temperature of 300 to 1800° C. within several milliseconds to form black fine particles with diameters ranging from 7 to 500 nm. Production processes used for this purpose include a furnace process, a channel process, an acetylene process, a thermal process and a lamp process. The features of these processes are summarized in Table 1.

The above conventional processes for producing hydrogen are based on a reaction under high temperature and high pressure conditions and, hence, cost ineffective. Further, the use of steam and oxygen poses a problem of the occurrence of toxic carbon monoxide and carbon dioxide causative of global warming. The conventional processes for producing carbon black require a high reaction temperature of 1200 to 1800° C. due to the utilization of thermal decomposition or incomplete combustion of natural gas or acetylene gas and, hence, are disadvantageously high in cost.

SUMMARY OF THE INVENTION

According to the present invention, the above problems can be solved by a process for simultaneously producing carbon black and hydrogen, wherein ethylene is fed into a reaction system having a temperature of 400° C. or above and a pressure of not less than 5 kg/cm² in an inert atmosphere in the presence of a nickel catalyst to decompose ethylene according to the following formula:

$$C_2H_4 \Delta 2C + 2H_2$$

DESCRIPTION OF THE PREFERRED EMBODIMENT

Figure 1:
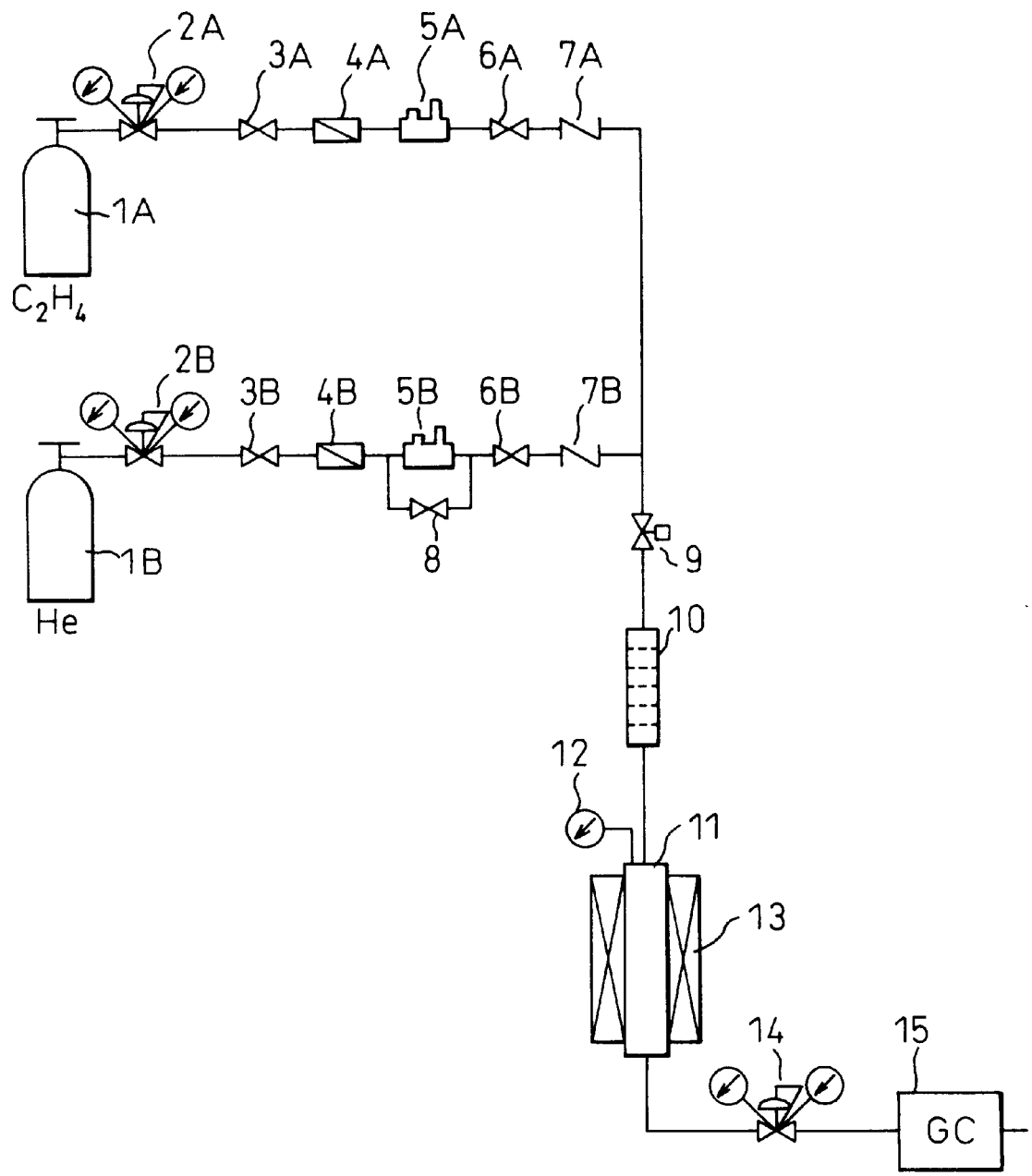
FIG. 1 is a flow chart of a reaction apparatus for use in the process of the present invention.

The present invention will be described in more detail with reference to the accompanying drawings. A flow chart of a reaction apparatus used in the process of the present invention is shown in FIG. 1. In FIG. 1, numeral 1A designates an ethylene bomb, numeral 1B a helium bomb, numerals 2A and 2B a reducing valve, numerals 3A, 3B, 6A, and 6B a valve, numerals 4A and 4B a filter, numerals 5A and 5B a mass flow controller, numerals 7A and 7B a check valve, numeral 8 a helium bypass valve, numeral 9 an emergency shutdown valve, numeral 10 a mixer, numeral 11 a reactor, numeral 12 a pressure gauge, numeral 13 a heater, numeral 14 a follow-up pressure valve, and numeral 15 a gas chromatograph (GC).

At the outset, the interior of the system was purged with a helium gas and pressurized with the helium gas to a predetermined pressure. The heater 13 for the reactor was turned on while the helium gas flowed to raise the temperature of the interior of the reactor 11 to a predetermined value. Thereafter, an ethylene gas was passed into the reactor 11. The helium gas was used for diluting the ethylene gas. The diluting gas is not limited to helium, and other inert gases, such as argon and nitrogen, may also be used for this purpose.

The flow rate of the ethylene gas is preferably 5 to 50 ml/min. When the flow rate exceeds 50 ml/min, ethylene emerges from the reactor, without being reacted, due to the excessively high flow rate, while a flow rate of less than 5 ml/min results in poor efficiency. The source of ethylene is not particularly limited. Specifically, any commercially available product may be used, or alternatively, ethylene may be produced by methane oxidation coupling according to the following formula:

$$2CH_4 + O_2 \Delta C_2H_4 + 2H_2O$$

Figure 2:
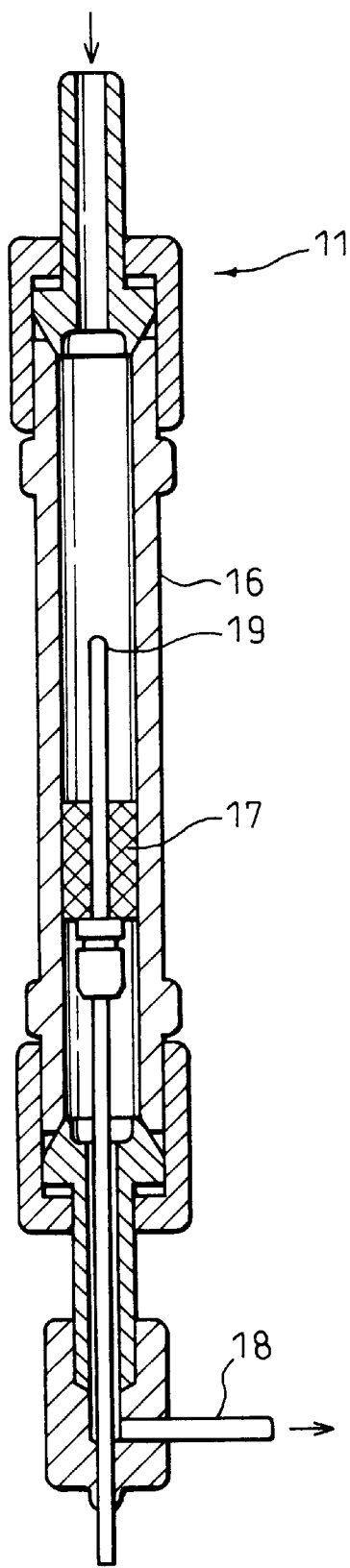
FIG. 2 is a schematic diagram of a reactor in the apparatus shown in FIG. 1.
Figure 3A:
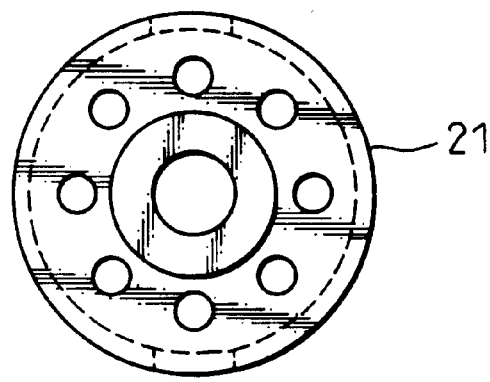
FIG. 3(a) is a plan view of a catalyst basket provided within the reactor.
Figure 3B:
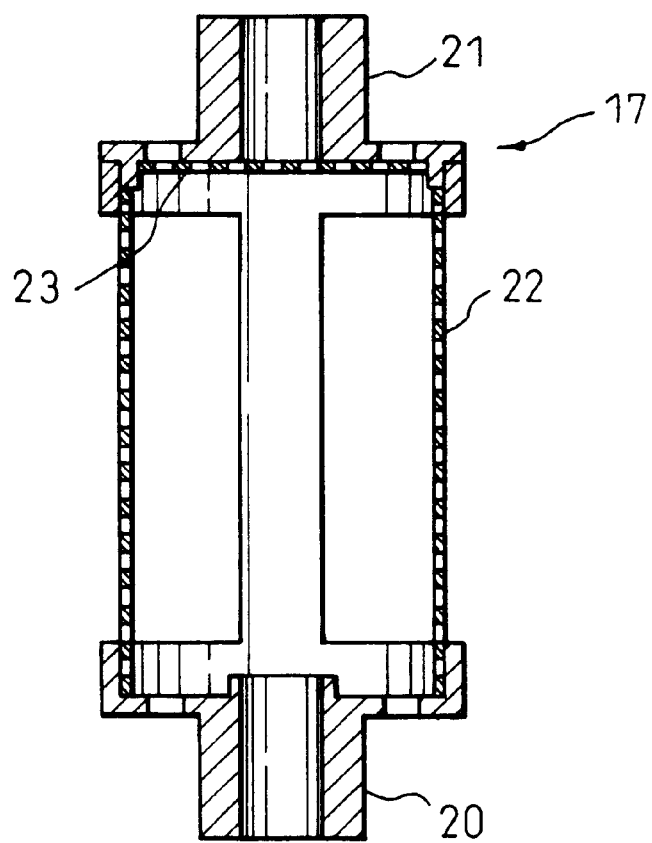
FIG. 3(b) is a sectional side view of a catalyst basket provided within the reactor.

Details of the reactor 11 shown in FIG. 1 are depicted in FIG. 2. An ethylene gas is introduced from the top into the body 16 of the reactor and reaches a catalyst basket 17. As shown in FIG. 3(a) and 3(b), the catalyst basket comprises a lower collar 20, a snap-in lid 21, a woven metal ring 22, and a woven metal lid 23. The interior of the woven metal ring 22 is packed with a nickel catalyst. The nickel catalyst is preferably in the form of particles, for example, having diameters of about 0.3 to 5 mm, from the viewpoint of increasing the surface area. However, the catalyst may be in the form of the bulk material, a tablet, or a needle, an Ni-coated material or the like.

The temperature within the reactor is detected by means of a thermometer placed within a thermometer protecting pipe 19 and kept at 400° C. or above by the heater 13. The reaction according to the present invention takes place at 400° C. or above. However, it is usually carried out at 400 to 600° C. according to the properties of the heater. A pressure within the reactor of not less than 5 kg/cm² suffices for the present invention. The pressure is preferably 5 to 10 kg/cm² from the viewpoint of the strength of the apparatus.

After the ethylene flowed for a predetermined period of time, the feed of ethylene was stopped and all the ethylene remaining unreacted within the system was reacted. The heater 13 was then turned off, and the system was purged with a helium gas to complete the reaction. The composition of the flow gas, which emerged from a pipe 18 provided in the reactor, was analyzed with the gas chromatograph 15.

Figure 4:
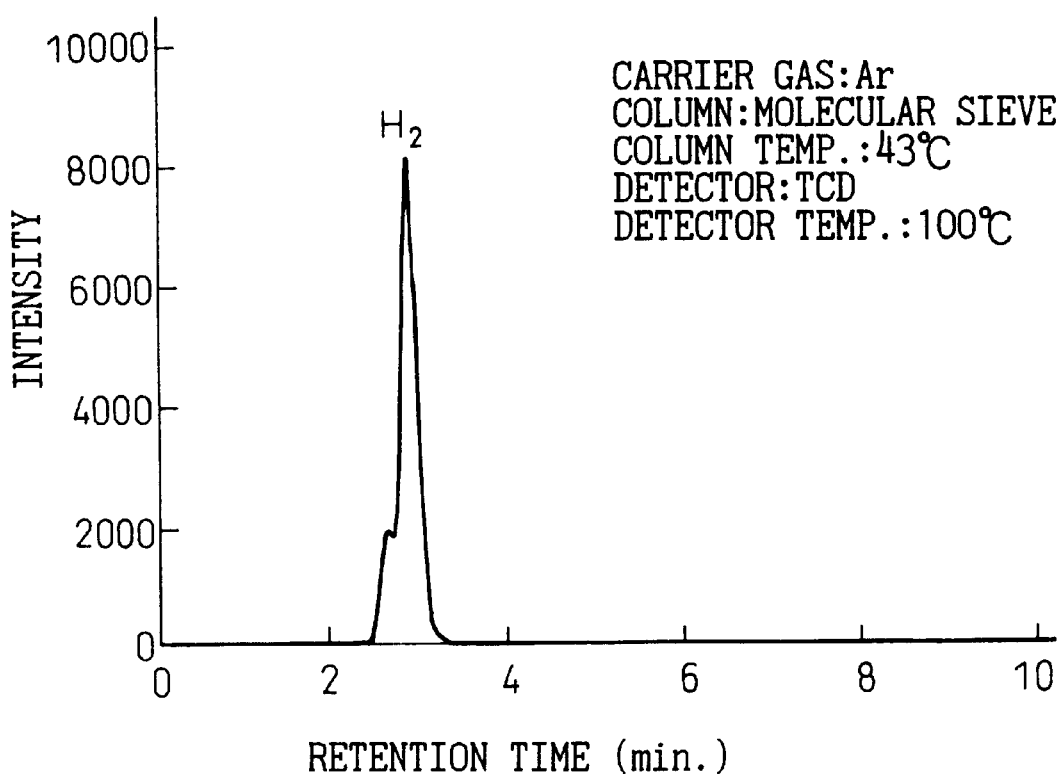
FIG. 4 is a diagram showing a gas chromatogram of produced hydrogen gas.

The produced gas had a gas chromatogram as shown in FIG. 4. In this chromatogram, there is a sharp peak derived from hydrogen, indicating that pure hydrogen was produced.

Figure 5:
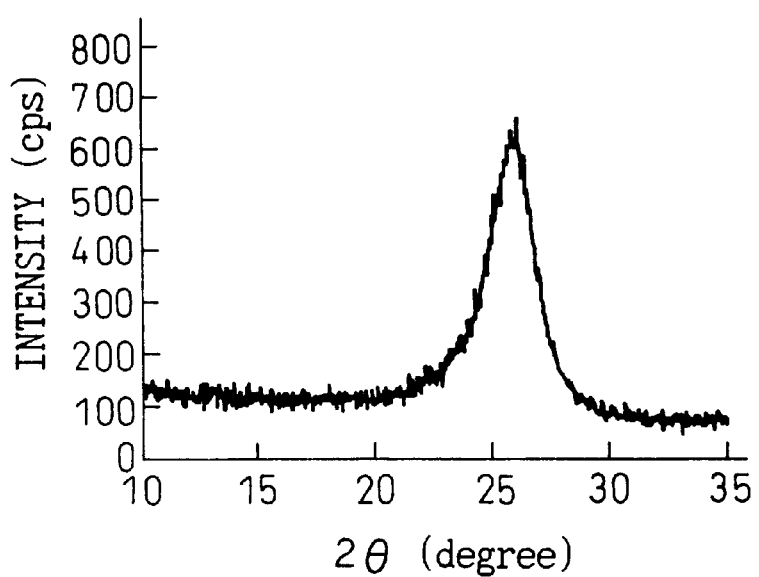
FIG. 5 is a diagram showing an X-ray diffraction pattern of produced carbon black.

Carbon black accumulated in the catalyst cartridge. This carbon black was analyzed by X-ray diffractometry. The X-ray diffraction pattern thus obtained is shown in FIG. 5. From this X-ray diffraction pattern, it is apparent that the produced carbon black is an amorphous one having a particle diameter of about 1 μm. The yield of carbon black under reaction conditions of flow rate of ethylene and helium 10 ml/min, temperature 400° C., pressure 5 kg/cm², and reaction time one hr was 87.9%.

Thus, according to the process of the present invention, hydrogen and carbon black can be produced in a high yield of not less than 50% at lower temperature and pressure than the temperature and pressure in the conventional process. Further, the produced hydrogen has high purity, and, hence, the process of the present invention, unlike the conventional process, can eliminate the need to separate hydrogen from the produced gas mixture. Furthermore, according to the process of the present invention, hydrogen and carbon black, which have been produced separately from each other by the conventional process, can be produced simultaneously.

I claim:

1. A process for simultaneously producing carbon black and hydrogen, wherein ethylene is fed into a reaction system having a temperature of 400° C. or above and a pressure of not less than 5 kg/cm² in an inert atmosphere in the presence of a nickel catalyst to decompose ethylene according to the following formula:

$$C_2H_4 \Delta 2C + 2H_2.$$

2. The process according to claim 1, wherein the ethylene is fed at a flow rate of 5 to 50 ml/min into the reaction system.

3. The process according to claim 1, wherein the temperature is 400 to 600° C.

4. The process according to claim 1, wherein the pressure is 5 to 10 kg/cm².

* * * * *